(12) United States Patent
Nagy

(10) Patent No.: US 9,478,138 B2
(45) Date of Patent: Oct. 25, 2016

(54) METHOD AND ON-BOARD UNIT FOR WARNING IN CASE OF WRONG-WAY TRAVEL

(71) Applicant: Kapsch TrafficCom AG, Vienna (AT)

(72) Inventor: Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 0 days.

(21) Appl. No.: 14/535,905

(22) Filed: Nov. 7, 2014

(65) Prior Publication Data

US 2015/0130643 A1 May 14, 2015

(30) Foreign Application Priority Data

Nov. 12, 2013 (EP) ..................... 13192426

(51) Int. Cl.
| | |
|---|---|
| *G08G 1/01* | (2006.01) |
| *G08G 1/16* | (2006.01) |
| *G08G 1/056* | (2006.01) |
| *G08G 1/0962* | (2006.01) |

(Continued)

(52) U.S. Cl.
CPC ............ *G08G 1/166* (2013.01); *G01C 21/26* (2013.01); *G08G 1/01* (2013.01); *G08G 1/0104* (2013.01); *G08G 1/056* (2013.01); *G08G 1/09626* (2013.01); *G08G 1/096716* (2013.01); *G08G 1/096758* (2013.01); *G08G 1/096783* (2013.01); *G08G 1/162* (2013.01)

(58) Field of Classification Search
CPC ...... G08G 1/056; G08G 1/01; G08G 1/0104; G08G 1/127; H04L 29/0809
USPC ............. 340/935, 995.23; 709/217, 218, 228
See application file for complete search history.

(56) References Cited

U.S. PATENT DOCUMENTS

| | | | | |
|---|---|---|---|---|
| 2002/0046285 A1* | 4/2002 | Yasushi | .................. | H04L 29/06 709/228 |
| 2011/0295976 A1* | 12/2011 | Baumann | ......... | G08G 1/096791 709/218 |

FOREIGN PATENT DOCUMENTS

| | | |
|---|---|---|
| DE | 102008059278 A1 | 6/2010 |
| DE | 202013005510 U1 | 7/2013 |

(Continued)

OTHER PUBLICATIONS

Extended European Search Report Received for EP Patent Application No. 13192426.8, mailed on Feb. 24, 2014, 9 pages (Official Copy only).

(Continued)

*Primary Examiner* — John A Tweel, Jr.
(74) *Attorney, Agent, or Firm* — Fiala & Weaver P.L.L.C.

(57) ABSTRACT

A method is disclosed for warning in case of wrong-way travel of a vehicle on a directional carriageway by means of an on-board unit carried by the vehicle, said on-board unit determining its position and direction of movement in a satellite-assisted manner, comparing the latter with a target direction of movement stored in a digital road map for this position and outputting a warning message when detecting a wrong-way travel, comprising: for a temporary change in course of a section of the directional carriageway, providing a radio beacon arranged upstream to said section and having a local radio coverage range; when the on-board unit enters the radio coverage range of the radio beacon, receiving a message sent by the radio beacon concerning the change in course in a transceiver of the on-board unit; and detecting the wrong-way travel depending on the received message.

6 Claims, 2 Drawing Sheets

Figure 1A:
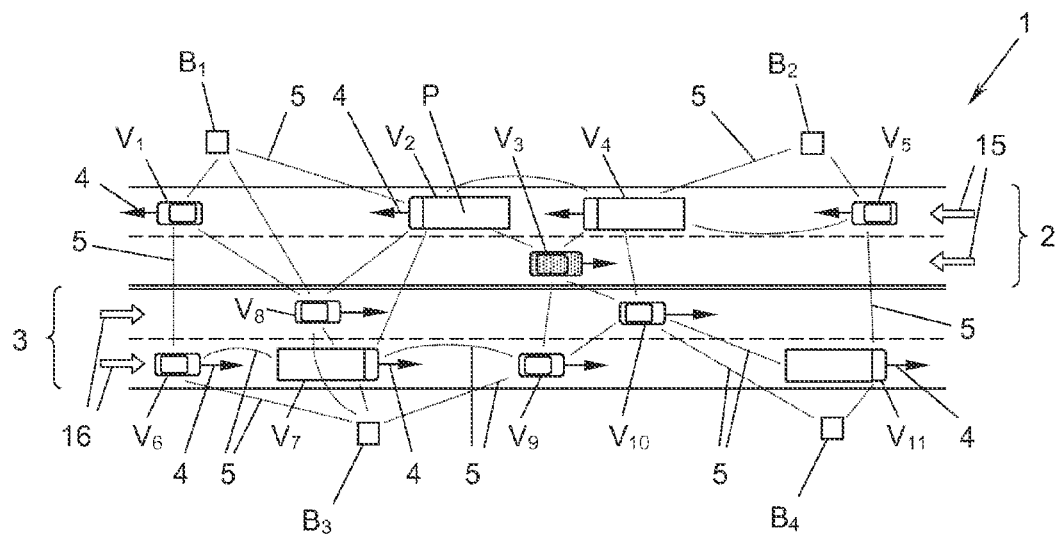

(51) Int. Cl.
*G08G 1/0967* (2006.01)
*G01C 21/26* (2006.01)

(56) References Cited

FOREIGN PATENT DOCUMENTS

| FR | 2797982 A1 | 3/2001 |
|---|---|---|
| FR | 2879000 A1 | 6/2006 |
| FR | 2972283 A1 | 9/2012 |

OTHER PUBLICATIONS

"Intelligent Transport Systems (ITS); Vehicular Communications; Basic Set of Applications; Definitions", Technical Report, European Telecommunications Standards Institute (ETSI), Jun. 2009, 81 pages.

\* cited by examiner

METHOD AND ON-BOARD UNIT FOR WARNING IN CASE OF WRONG-WAY TRAVEL

CROSS-REFERENCE TO RELATED APPLICATION(S)

This application claims priority to European Patent Application No. 13 192 426.8, filed on Nov. 12, 2013, the entirety of which is incorporated by reference herein.

BACKGROUND

1. Technical Field

The present subject matter relates to a method for warning in case of wrong-way travel of a vehicle on a directional carriageway by means of an on-board unit carried by the vehicle, said on-board unit determining its position and direction of movement in a satellite-assisted manner, comparing the latter with a target direction of movement stored in a digital road map for this position and outputting a warning message when detecting a wrong-way travel. The present subject matter also relates to an on-board unit for such a method.

2. Background Art

On directional carriageways, for example motorways, highways, or dual directional carriageways, serious accidents occur as a result of wrong-way travel, since vehicles travelling the wrong way are not perceived in good time by other road users due to the high differences in speed, often insufficient ranges of vision and/or a lack of attention and preparation on the part of said other road users. In order to prevent accidents of this type, infrastructure measures have been taken previously, which are intended to prevent erroneous driving of a vehicle against the directional carriageway direction, for example physical separation of the joining and leaving slip roads, particular markings or warning signs, or warning messages in the case of detection of a vehicle travelling in the wrong direction, for example output via radio. However, these measures are incomplete, since they do not reach all road users.

Current satellite-assisted systems for position detection (global navigation satellite systems, GNSS) have sufficiently high accuracy for position detection that is accurate at lane level and can also determine the direction of movement. Compared with a digital road map, which is likewise accurate at lane level and which has stored a target direction of movement for each lane or position on the directional carriageway, an automatic detection and consequently also an automatic warning in the case of wrong-way travel of a vehicle is therefore possible, as is described for example in document WO 2012/120224 A1.

With the high spread of existing vehicles with on-board navigation systems or road toll on-board units with satellite-assisted position determination and an output unit for example for warning messages, a broad use of such a warning system in the case of wrong-way travel is possible. However, the usability of the warning system is limited by a lack of up-to-dateness of the map material used in the on-board unit and the high cost associated with the distribution (in particular the comprehensive distribution) of up-to-date maps; it is thus inflexible with regard to changes, thus resulting in errors in the detection and inaccurate warning messages.

BRIEF SUMMARY

The object of the disclosed subject matter is to create a method and an on-board unit which are more flexible in use and avoid erroneous warning messages.

In accordance with a first aspect of the disclosed subject matter, the object is achieved with a method of the type mentioned in the introduction, which comprises:

for a temporary change in course of a section of the directional carriageway, providing a radio beacon arranged upstream to said section and having a local radio coverage range;

when the on-board unit enters the radio coverage range of the radio beacon, receiving a message sent by the radio beacon concerning the change in course in a transceiver of the on-board unit; and detecting the wrong-way travel depending on the received message.

A benefit of the present subject matter is to firstly be able to take into consideration temporary changes in course of a section of the directional carriageway in a method for warning in the case of wrong-way travel. A warning message is thus made dependent on the actual, current course of the directional carriageway, and superfluous warning messages are avoided. Due to the use of a radio beacon with a local radio coverage range, it is also possible to activate the warning system locally, for example by on-site road work personnel, instead of by a remote central unit, whereby faults in the information sharing and distribution are significantly reduced. A complex comprehensive updating of all digital road maps in all on-board units is thus also unnecessary, which makes the use of the method worthwhile, in particular in respect of short-term changes in course, for example as a result of accidents or temporary road works.

In accordance with an example embodiment, the on-board unit suspends the detection of the wrong-way travel for a limited period of time or stretch of road on account of the received message. Erroneous warning messages caused by driving on the opposite directional carriageway, for example in a road works area, are thus suppressed temporarily. The function of the warning system, however, is then retained again or resumed. This embodiment, due to the quick, flexible usability thereof in conjunction with a low adaptation effort, can be used particularly favourably with changes in course that are strictly limited in terms of time and/or location.

In accordance with an alternative embodiment, the received message contains a local detail of the digital road map with the change in course, wherein the on-board unit replaces the stored road map in the local detail with the received map detail for a limited period of time or stretch of road in order to detect the wrong-way travel. In contrast to the aforementioned suspension of the detection, in this variant the method for warning in the case of wrong-way travel is maintained continuously, but an updated local detail of the road map is used as a basis in the section of the change in course. As a result, not only are erroneous warning messages avoided, but additionally wrong-way travel in said section of the change in course is detected correctly, and a warning message is output, which brings safety advantages precisely in road works sections, which are often confusing, in particular when a traffic junction, for example a motorway junction or a joining or leaving slip road, is present therein. The method thus works completely without interruption.

In the simplest case, the period of time or stretch of road can be fixedly defined, however the period of time or stretch of road may be specified in the received message. Even with a change in course over a longer section of the directional carriageway, an individual radio beacon is thus sufficient to provide a notification, and an overlong suspension of the detection or the transmission of an unnecessarily large local detail of the digital road map in the message can be avoided.

Alternatively, it is possible for the period of time or stretch of road to be limited by the receipt of a further message, which is received from a further radio beacon arranged downstream of the specified section and having a local radio coverage range. This leads to a simple structure of the message received in the on-board unit from the upstream radio beacon, which facilitates a use of small, movable radio beacons, which for example can be integrated in road works vehicles or emergency vehicles or even traffic signs.

Since current on-board units are often capable of forming an ad-hoc network with other on-board units or radio beacons, for example in accordance with the standards IEEE 802.11p, ITS-G5 or WAVE, it is advantageous if the on-board unit also transmits the warning message to on-board units of other vehicles and/or to radio beacons with which the on-board unit is in short-range radio communication. The warning message in the case of wrong-way travel is thus forwarded quickly from vehicle to vehicle or to radio beacon and other vehicles are warned in good time.

Via such a short-range radio communication, an on-board unit according to a further example embodiment receives, from another on-board unit, at least one information item concerning the position and direction of movement thereof so as to detect, in the specified manner, wrong-way travel of a vehicle carrying the other on-board unit, wherein the detection of this wrong-way travel is also carried out depending on the received message. The method can thus be used not only for the detection of wrong-way travel of a vehicle carrying the on-board unit carrying out the method, but also for other vehicles, of which the on-board units themselves indeed determine the position and optionally also direction of movement of said vehicles and for example exchange within the scope of a common awareness message (CAM) according to the ITS-G5 or WAVE standard in the ad-hoc network, but do not themselves carry out the method. Even with just a small spread of the on-board unit carrying out the method among road users, an approximately comprehensive warning in the case of wrong-way travel of a vehicle is thus possible.

In accordance with a second aspect, the disclosed subject matter creates an on-board unit for a vehicle for warning in case of wrong-way travel of the vehicle on a directional carriageway, comprising a satellite receiver for determining its position and direction of movement, a transceiver for short-range radio communication, a map memory for a digital road map, a detection unit for detecting wrong-way travel by means of a comparison of the determined direction of movement with a target direction of movement stored in the road map for the determined position, as well an output unit for warning messages controlled by the detection unit, wherein the on-board unit is configured to, upon receipt in the transceiver of a message sent by a radio beacon concerning a temporary change in course of a section of the directional carriageway, detect the wrong-way travel depending on the received message.

With regard to the advantages and further embodiments of the on-board unit, reference is made to the previous comments concerning the method.

Further features and advantages, as well as the structure and operation of various embodiments, are described in detail below with reference to the accompanying drawings.

BRIEF DESCRIPTION OF THE DRAWINGS/FIGURES

Figure 1B:
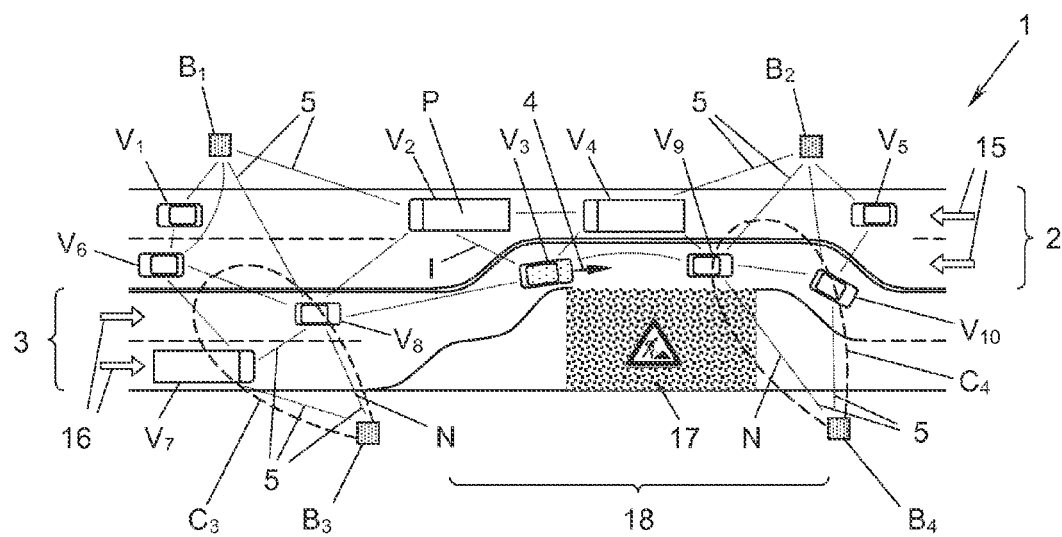
Figure 2:
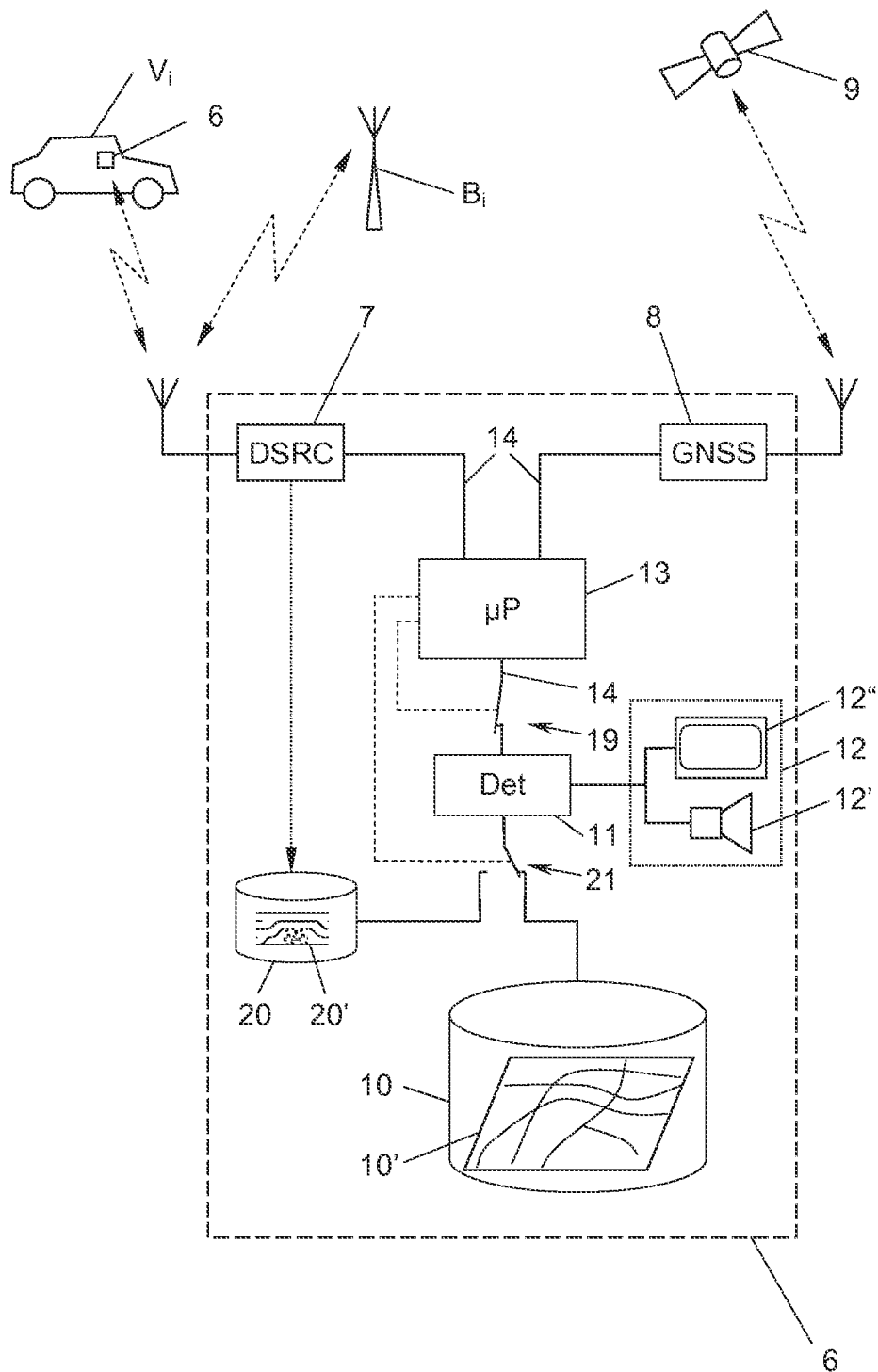

The present subject matter will be explained in greater detail hereinafter on the basis of exemplary embodiments illustrated in the companying drawings, in which:

FIGS. 1a and 1b show a schematic plan view of vehicles on directional carriageways, wherein the directional carriageways do not have any change in course (FIG. 1a) or a temporary change in course (FIG. 1b), respectively; and FIG. 2 shows an on-board unit as a block diagram, according to an embodiment.

Embodiments will now be described with reference to the accompanying drawings.

DETAILED DESCRIPTION

According to FIG. 1a a number of vehicles $V_1, V_2, \ldots$, generally $V_i$, are travelling on a road 1 with two directional carriageways 2, 3, in each case at a speed in a direction of movement 4. The directional carriageways 2, 3 each have one or more lanes (in the example of FIG. 1a two lanes each). Each of the vehicles $V_i$ is in short-range radio communication 5 with one or more other vehicles $V_i$ and/or with stationary radio beacons $B_1, B_2, \ldots$, generally $B_i$, for example attached laterally or above the directional carriageways 2, 3, for example according to standards IEEE 802.11p, WAVE (wireless access in vehicular environments), DSRC (dedicated short range communication) or ITS-G5. The radio beacons $B_i$ can also be connected to one another and/or to a central unit (not illustrated).

Each vehicle $V_i$ carries an on-board unit 6 according to FIG. 2. Besides a transceiver 7 for the described short-range radio communication 5 with other vehicles $V_i$ and radio beacons $B_i$, the on-board unit 6 has a satellite receiver 8, which determines the position P and direction of movement 4 of the on-board unit 6 with the aid of satellites 9 of a global satellite navigation system (global navigation satellite system, GNSS). In order to increase the accuracy of the position determination, further sensors, for example speed or acceleration sensors, and/or processing units for predictive or corrective estimation of the course of movement can be used in addition to the satellite receiver 8, when desired.

The on-board unit 6 further comprises a map memory 10 for a digital road map 10', a detection unit 11 and an output unit 12, controlled thereby, for warning messages. A control unit 13 of the on-board unit 6, which is in data communication 14 with the transceiver 7, the satellite receiver 8 and the detection unit 11 controls the processes of the on-board unit 6.

The detection unit 11 compares the direction of movement 4 of the on-board unit 6, determined in a satellite-assisted manner, with a target direction of movement 15, 16 (FIG. 1a) stored in the digital road map 10' for a position P likewise determined in a satellite-assisted manner, and, on the basis of a predefined deviation of the determined direction of movement 4 from the target direction of movement 15, 16, detects the wrong-way travel of the on-board unit 6 and therefore of the vehicle $V_i$ carrying the on-board unit 6, whereupon the output unit 12 is activated to output a warning message.

In the illustrated example of FIG. 1a, the on-board unit 6 of the vehicle $V_3$ detects that the determined position P thereof is on the directional carriageway 2, however the determined direction of movement thereof 4 goes against the target direction of movement 15 of the directional carriageway 2 and the vehicle $V_3$ is thus travelling in the wrong direction. The output unit 12 of the on-board unit 6 of the vehicle $V_3$ is therefore activated by the detector 11 to output a warning message as a result of the detection of the wrong-way travel.

The warning message could be provided acoustically via a loudspeaker 12' and/or optically via a display 12"; it goes without saying that loudspeakers or displays present in a vehicle $V_i$ may also optionally be used for this purpose, and the on-board unit 6 may be connected to these built-in elements of the vehicle $V_i$ for this purpose. Furthermore, the on-board unit 6 itself could also be constructed as a modularised ("virtual") on-board unit by means of networking of modules already provided in a vehicle $V_i$ and necessary for this purpose. The connection or networking of the modules can be wired here, for example by means of FlexRay® or CAN bus (controller area network), or can be wireless, for example by means of Bluetooth or WLAN. Alternatively, the on-board unit 6 may be a satellite navigation device carried by the vehicle $V_i$, a road map on-board unit 6 or an on-board unit 6 for a general traffic telematics system, which in each case has a transceiver 7 for the short-range radio communication.

With the aid of the transceiver 7, the on-board unit 6 of the vehicle $V_3$ in the example of FIG. 1a can also transmit the warning message to on-board units 6 of other vehicles $V_i$—here the vehicles $V_2$, $V_4$, $V_9$ and $V_{10}$—and/or to radio beacons $B_i$, with which the on-board unit 6 is in short-range radio communication 5. When desired, the vehicles $V_2$, $V_4$, $V_9$, $V_{10}$ in short-range radio communication with the vehicle $V_3$ in the example of FIG. 1a can then forward the specified warning message to further vehicles $V_i$ and radio beacons $B_i$, with which they themselves are in short-range radio communication 5. Besides the vehicle $V_3$ itself travelling in the wrong way, other vehicles $V_i$, in particular travelling in the opposite direction, are thus also warned in good time before encountering the vehicle $V_3$ travelling in the wrong direction.

In the example of FIG. 1b there is a temporary change in course of a section 18 of the directional carriageway 3 due to road works 17, such that the directional carriageway 3 in this section extends over the opposite directional carriageway 2. Since this change in course 18 is only temporary, for example a measure caused by an accident, temporary road works or another temporary measure, no new digital road maps are stored in the map memory 10 of all on-board units 6 of all road users.

As a result of the change in course 18, the vehicles $V_2$ using the directional carriageway 3 are diverted onto the opposite directional carriageway 2. In the example of FIG. 1b, the vehicle $V_3$ thus travels on the directional carriageway 2 against the target direction of travel 15 stored in the digital road map 10' of the map memory 10 for the position P of the vehicle $V_3$ (or for the directional carriageway 2), but without travelling incorrectly. In order to avoid erroneous warning messages in this case, a radio beacon $B_3$ arranged upstream of the specified section 18 is now provided with a local radio coverage range $C_3$.

The radio beacon $B_3$, via a short-range radio communication 5, sends to on-board units 6 entering the radio coverage range $C_3$ of the radio beacon $B_3$ a prepared message N concerning the change in course 18, which is received in the transceiver 7 of the on-board unit 6, whereupon the on-board unit 6 detects the wrong-way travel depending on or in consideration of the received message N.

The local radio coverage range $C_i$ of a radio beacon $B_i$—here the radio coverage range $C_3$ of the radio beacon $B_3$—may be limited here to the directional carriageway 3 or even to a lane, for example with the aid of an accordingly oriented antenna with directional characteristic, wherein the radio beacon $B_i$ for example can be arranged beside the road 1 or on a bridge (not shown) crossing said road. Alternatively, the radio beacon $B_i$ may have an antenna with omnidirectional characteristic, whereby an orientation towards a directional carriageway 2, 3 or a lane is spared.

The on-board unit 6 suspends the detection of the wrong-way travel due to the message N received from the radio beacon $B_3$ for a limited period of time or stretch of road, as is illustrated symbolically by an off switch 19 of the on-board unit 6, controlled by the control unit 13, for switching off the detection unit 11 on account of the received message N. Here, the off switch 19 can be provided in software or as a hardware switch, as illustrated in FIG. 2. Alternatively, the message N received from the radio beacon $B_3$ in the on-board unit 6 may contain a local detail 20' of the digital road map 10' with the change in course 18, wherein the on-board unit 6 replaces the stored road map 10' in the local detail with the received map detail 20' for a limited period of time or stretch of path for the detection of the wrong-way travel. In this alternative possible embodiment, the on-board unit 6 for example has a memory 20 for storing the local detail 20' with the change in course 19 contained in the received message N and a changeover switch 21 (illustrated symbolically) controlled by the control unit 13 for switching over from the map memory 10 to the memory 20 as a result of the received message N. It goes without saying that the changeover switch 21 can also be formed as a hardware or software switch, and the map memory 10 and memory 20 may also be present in the same physical memory element.

The specified limited period of time or stretch of road on the one hand can be predefined in a fixed manner in the on-board unit 6, wherein, in the case of a longer section 18 with change in course, a number of successive radio beacons $B_i$ may possibly also be provided, in each case for sending a further message N concerning the change in course, or this may be specified in the message N itself received from the radio beacon $B_3$. Alternatively, it is also possible for the period of time or stretch of road to be limited by receipt of a further message N, which is received from a further radio beacon $B_i$ arranged downstream of the specified section 18 (in the example of FIG. 1b the radio beacon $B_4$) with a local radio coverage range $C_4$. In this embodiment, the radio beacon $B_3$ also switches off the detection unit 11 or switches over from the map memory 10 to the memory 20, whereas the radio beacon $B_4$ switches the detection unit 11 on again or switches back again from the memory 20 to the map memory 10.

The radio beacons $B_i$ can also be integrated for example in road signs, for example road works warning signs, or in construction vehicles or emergency vehicles; it is, however, also possible to use merely radio beacons $B_i$ already existing to send the specified message, for example radio beacons $B_i$ on joining or leaving slip roads or elsewhere in the course of the directional carriageways 2, 3.

It is also possible to use the described method for an on-board unit 6 that receives from another on-board unit 6 at least one information item I concerning the position P and direction of movement 4 thereof via the short-range radio communication 5 so as to detect in the specified manner a wrong-way travel of a vehicle $V_1$ carrying the other on-board unit 6; here, a wrong-way travel of the specified other vehicle $V_i$ is detected in the first-mentioned ("a") on-board unit 6 as described, likewise depending on the message received from a radio beacon $B_i$.

Conclusion

The invention is not limited to the presented embodiments, but includes all variants and modifications that fall within the scope of the accompanying claims.

What is claimed is:

1. A method for warning in case of wrong-way travel of a vehicle on a directional carriageway by an on-board unit carried by the vehicle, said on-board unit determining its position and direction of movement in a satellite-assisted manner, comparing the latter with a target direction of movement stored in a digital road map for this position and outputting a warning message when detecting a wrong-way travel, comprising:

for a temporary change in course of a section of the directional carriageway, providing a radio beacon arranged upstream of said section and having a local radio coverage range;

when the on-board unit enters the radio coverage range of the radio beacon, receiving a message sent by the radio beacon concerning the change in course in a transceiver of the on-board unit; and detecting the wrong-way travel depending on the received message, wherein the on-board unit suspends the detection of the wrong-way travel once for a limited period of time or stretch of road on account of the received message.

2. The method according to claim 1, wherein the period of time or stretch of road is specified in the received message.

3. The method according to claim 1, wherein the period of time or stretch of road is limited by the receipt of a further message, which is received from a further radio beacon arranged downstream of the specified section and having a local radio coverage range.

4. The method according to claim 1, wherein the on-board unit also transmits the warning message to on-board units of other vehicles and/or to radio beacons with which the on-board unit is in short-range radio communication.

5. The method according to claim 1 for an on-board unit which receives, from another on-board unit, at least one information item concerning the position and direction of movement thereof so as to detect, in the specified manner, a wrong-way travel of a vehicle carrying the other on-board unit, wherein the detection of this wrong-way travel is also carried out depending on the received message.

6. An on-board unit for a vehicle for warning in case of wrong-way travel of the vehicle on a directional carriageway, comprising a satellite receiver for determining its position and direction of movement, a transceiver for short-range radio communication, a map memory for a digital road map, a detection unit for detecting wrong-way travel by a comparison of the determined direction of movement with a target direction of movement stored in the road map for the determined position, as well an output unit for warning messages controlled by the detection unit, wherein the on-board unit is configured to, upon receipt in the transceiver of a message sent by a radio beacon concerning a temporary change in course of a section of the directional carriageway, detect the wrong-way travel depending on the received message, wherein the on-board unit has an off-switch controlled by the message for switching off the detection unit on account of the received message.

* * * * *